Figure 1:
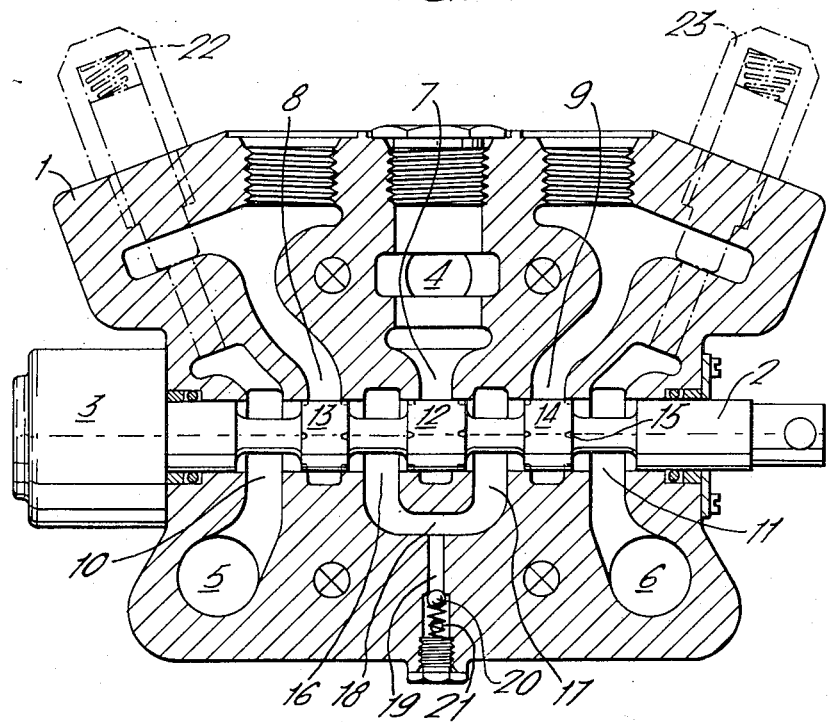

United States Patent [19]
Marshall

[11] 3,804,123
[45] Apr. 16, 1974

[54] HYDRAULIC VALVES

[75] Inventor: John Stephen Marshall, Woking, England

[73] Assignee: Sperry Rand Limited, London, England

[22] Filed: Jan. 10, 1973

[21] Appl. No.: 322,532

[30] Foreign Application Priority Data
Jan. 14, 1972 Great Britain...................... 1801/72

[52] U.S. Cl...... 137/625.69, 137/596.12, 137/625.3
[51] Int. Cl............................................. F16k 11/07
[58] Field of Search..... 137/625.25, 625.67, 625.68, 137/625.29, 596, 596.12, 596.13, 625.3

[56] References Cited
UNITED STATES PATENTS
3,263,574   8/1966   Tennis....................... 137/625.69 X

*Primary Examiner*—Henry T. Klinksiek
*Attorney, Agent, or Firm*—Barnes, Kisselle, Raisch & Choate

[57] ABSTRACT

A hydraulic control valve having a valve spool sliding axially in a bore provided with a central port for connection to a high pressure supply, a pair of service ports for connection to a load and a pair of outlet ports, the spool having raised lands co-operating with the ports for admitting fluid under pressure to either one of the service ports and allowing it to escape from the other when the spool is moved from its neutral position.

3 Claims, 4 Drawing Figures

HYDRAULIC VALVES

The present invention provides a modified valve particularly suitable for load sensing in systems employing pressure controlled pumps, or in any other systems which require sensing of the pressures in the service ports.

According to the present invention, a valve of the above kind is provided with a further pair of ports betwen the supply port and the service ports joined by a gallery having an external connection, the valve spool having a land which in the neutral position of the valve closes the supply port. The land widths of the spool are such that, on displacement of the spool, the gallery communicates with one or the other of the service ports before communication is established with the supply port. The external connection from the gallery, when the valve is in use in a pressure-controlled system, will normally be connected to the compensator of the pump for regulating the supply pressure. Preferably a check valve is incorporated in the passage, and preferably also where two or more valves are to be operated in parallel from the same supply, a hydraulic fuse is incorporated between the additional ports and one of the tank ports.

When the valve is in use, the gallery serves for sensing the load pressure. In previously known valves equipped with load sensing means, these means have consisted of fine passages drilled through the body casting of the valve closely adjacent to the edges of the service ports. The accurate drilling and spacing of these passages has introduced problems of machining and pressure balancing of the valves. The present construction provides a simple and robust form of valve in which the problems of accurate machining are largely transferred to the valve spool itself, where they are more readily solved.

Figure 2:
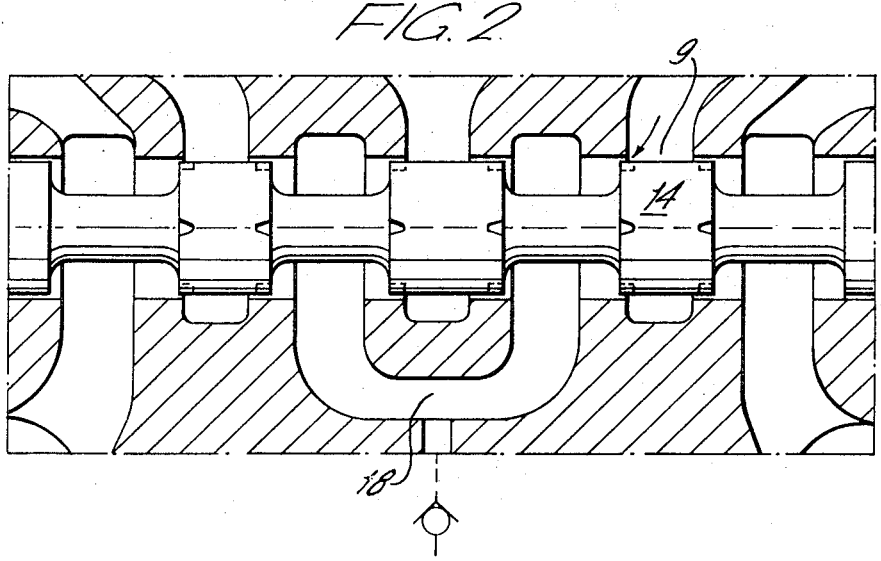
Figure 3:
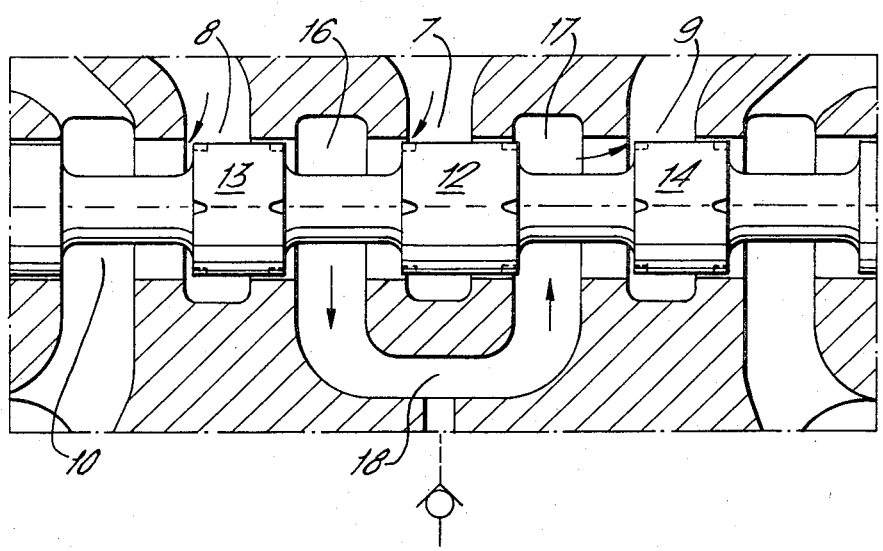
Figure 4:
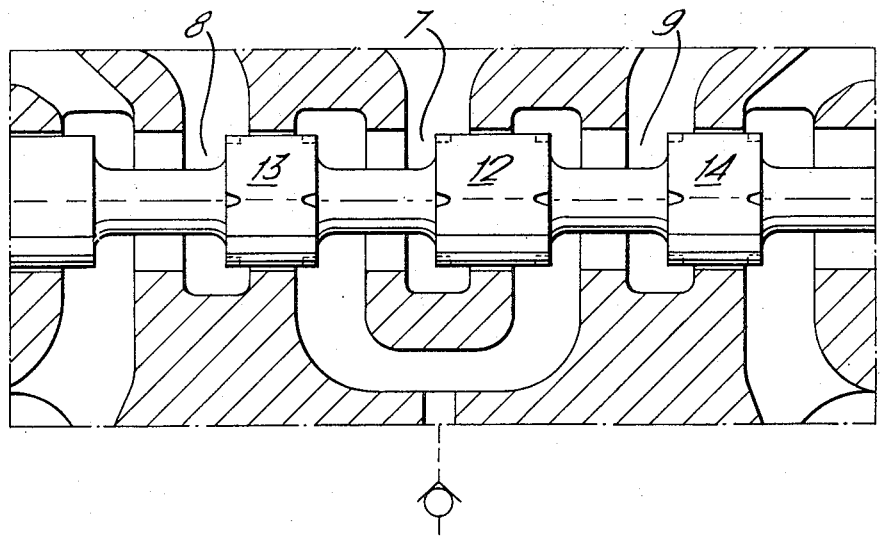

The invention will be further described, by way of example, with reference to the drawings accompanying the provisional specification in which:

FIG. 1 is a section of a valve according to the invention, along the spool axis; and FIGS. 2, 3 and 4 are diagrams illustrating successive stages in the operation of the valve.

Referring first to FIG. 1, the valve comprises a valve body 1 having a cylindrical bore in which works the valve spool 2. At one end of the valve spool a spring and/or detent device 3 may be provided for returning the spool 2 to its neutral centre position, and/or indexing it in selected positions.

The valve is of a kind intended to be assembled with similar valves in a banked construction, so that its faces, in planes parallel to the drawing, are flat and provided with fluid seals. A passage 4 through the valve forms a gallery for connection to the supply, and passages 5 and 6 form a gallery for connection to tank when a number of valves are assembled.

The valve body is provided with a supply port 7 connected to the supply gallery 4, a pair of service ports 8 and 9 for connection to the device to be actuated under control of the valve, and a pair of tank ports 10, 11 which communicate with the tank galleries 5, 6.

The valve spool is provided with a raised land 12, which closes the supply port 7, and with lands 13, 14 which close the service ports 8,9 when the spool is central in its neutral position. These may be provided with inching grooves 15. The valve spool is designed to give a slight overlap, so that in the neutral position the circuit connected to the service ports is hydraulically locked, and the valve has a small dead zone.

In accordance with the present invention, a further pair of ports 16, 17, are provided in the valve bore, one on either side of the supply port 7, and communicating with one another by a gallery 18. In the normal intended use of the valve this gallery serves for sensing the load pressure as soon as the valve spool is moved out of its central position. The gallery communicates by a passage 19, in which is incorporated a check valve 20, with a gallery 21 passing through the bank of valves when a number are connected together. In use, this gallery is connected to a pressure compensator which controls the delivery of the supply pump or other control means so as to maintain the supply pressure in excess of the load pressure by a convenient margin, for example, in a system having a maximum operating pressure of, say, 2,500 lbs. per square inch suitable for a mobile installation, the supply pressure may be controlled at some small pressure, for example 350 lbs. per square inch above the load pressure. The compensator may include a bleed through a small restrictor to tank, so that when all the valves are in the neutral position, the pressure in the load sensing gallery 18 falls until it is substantially equal to the tank pressure and the compensator or other control means then causes the pump to idle at a pressure which is marginally above tank pressure. Alternatively a small restrictor to tank may be included in the valve bank in a convenient position. Service port relief valves or anticavitation valves, or combinations of these, represented by the dotted outlines 22, 23, may be incorporated in the valve if required.

The operation of the control valve will now be further described, referring also to the diagrams constituting FIGS. 2, 3 and 4 of the drawings.

Assuming the control valve to be initially in its neutral position, as shown in FIG. 1, the pressure in the load sensing gallery 18 will fall by reason of the bleed through the restrictor at the compensator until it is substantially equal to tank pressure, and the compensator will then cause the pump to idle, so that it maintains a pressure which is only in excess of the tank pressure by the operating margin, which in the example given above is 350 lbs. per square inch. Since the gallery 18 and the ports 16 and 17 are substantially at tank pressure, they serve as an anti-creep device, so that even if the supply pressure should rise, for example by reason of operation of some other valve connected to the same supply, leakage from the supply port 7 cannot reach either of the service ports, and inadvertent movement of the load is thereby avoided.

When the operator moves the control handle, displacing the valve spool slightly to the right, the position shown in FIG. 2 is first reached. In this position the valve land 14 is just beginning to uncover the service port 9 establishing a connection between the port 9 and the gallery 18, which in cross-section is substantially in excess of the bleed through the restrictor at the compensator. The pressure in the gallery 18 thereupon rises until it is equal to the load pressure in the service port 9, and operates the compensator or other control means causing an increase of supply of fluid under pressure, and raising the pressure in the supply gallery 4 until it exceeds the pressure in the load by the working margin of 350 lbs. per square inch. Further operation of the valve spool as shown in FIG. 3 causes the land 12 to start uncovering the supply port 7. Fluid now can flow from the supply port 7 as shown by the arrows, through the port 16, along the gallery 18, and through the port 17 into the service port 9. At the same time the land 13 uncovers the other service port 8 permitting fluid from this to be vented to tank via the port 10. The relationships between the edges of the ports are such that control occurs at the edge of land 12, and the pressure in the gallery 18 is substantially equal to the load pressure. FIG. 4 shows the position when the valve is fully open.

When a number of valves of this pattern are banked together, for example in a control system for mobile equipment, it will be appreciated that the operation of any one valve will cause the pressure in the compensator line to rise, and therefore close the check valves 20 of the other control valves, sealing off their load-sensing galleries 18 from the compensator line. To avoid an undesirable rise of pressure in these valves, a hydraulic fuse (not shown in the drawing) may be provided between the load-sensing gallery and one of the tank galleries.

For some purposes, for example, for controlling hydraulic motors, it may be required to have the service ports 8 and 9 connected to the tank ports 5 and 6 by way of the galleries 10 and 11 when the valve spool 2 is in the neutral position. This may easily be done with a valve of the kind described with reference to FIG. 1 by suitably proportioning the spool lands. The operation of such a valve is substantially as described above.

Although the invention has been described with reference to a bankable valve, it is, of course, equally suitable for use with monobloc valves. If a valve of this kind is not to be incorporated in a pressure compensated system, the ports 16 and 17, and the gallery 18, can still be utilised for the prevention of creep by providing them with a bleed through a restrictor to tank.

What we claim is:

1. A hydraulic control valve having a valve spool axially slidable in a bore provided with a central port for connection to a high pressure supply, a pair of service ports for connection to a load, and a pair of outlet ports, the spool having raised lands cooperating with the ports for admitting fluid under pressure to either one of the service ports and allowing it to escape from the other when the spool is moved from its neutral position, and having a further pair of ports between the supply port and the service ports joined by a gallery having an external connection, the valve spool having a land which in the neutral position of the valve closes the supply port, the lands being dimensioned so that on moving the spool the gallery communicates with one or the other of the service ports before the supply port.

2. A valve according to claim 1 in which the valve bore is formed in a block having a pair of plane parallel faces with passages drilled through the block and with seals at its faces to provide connection for supply pressure, exhaust to tank, and a load-sensing line, and in which the additional gallery communicates with the load sensing passage through a check valve so that a number of valves may be operated together, the communicating passages providing common supply, tank, and load-sensing lines.

3. A hydraulic valve according to claim 1 in which a hydraulic fuse is inserted between the additional gallery and one of the tank galleries.

* * * * *